United States Patent
Miyakawa et al.

(10) Patent No.: US 10,057,482 B2
(45) Date of Patent: *Aug. 21, 2018

(54) ELECTRONIC CAMERA, IMAGE DISPLAY DEVICE, AND STORAGE MEDIUM STORING IMAGE DISPLAY PROGRAM

(71) Applicant: NIKON CORPORATION, Chiyoda-ku, Tokyo (JP)

(72) Inventors: Yoshiaki Miyakawa, Tokyo (JP); Shigenori Fujio, Koshigaya (JP)

(73) Assignee: NIKON CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/694,761

(22) Filed: Sep. 1, 2017

(65) Prior Publication Data
US 2017/0366742 A1 Dec. 21, 2017

Related U.S. Application Data

(63) Continuation of application No. 14/402,004, filed as application No. PCT/JP2013/003253 on May 22, 2013, now Pat. No. 9,774,778.

(30) Foreign Application Priority Data

May 22, 2012 (JP) ................. 2012-116258

(51) Int. Cl.
*H04N 5/232* (2006.01)
*H04N 5/77* (2006.01)
(Continued)

(52) U.S. Cl.
CPC ..... *H04N 5/23216* (2013.01); *G06F 3/04847* (2013.01); *G06F 3/04883* (2013.01);
(Continued)

(58) Field of Classification Search
CPC ............ G06F 3/04883; G06F 3/04886; G06F 3/04847; H04N 5/23216; H04N 5/23293; H04N 5/23229
(Continued)

(56) References Cited

U.S. PATENT DOCUMENTS 8,525,855 B1 9/2013 Freyhult et al.
9,774,778 B2 * 9/2017 Miyakawa ......... H04N 5/23216
(Continued)

FOREIGN PATENT DOCUMENTS

JP 2008-217785 A 9/2008
JP 2010-079780 A 4/2010
(Continued)

OTHER PUBLICATIONS

Chinese Office Action dated Mar. 20, 2017 as issued in corresponding Chinese Application No. 201380026576.9 and its English translation thereof.
(Continued)

*Primary Examiner* — Antoinette Spinks
(74) *Attorney, Agent, or Firm* — Foley & Lardner LLP

(57) ABSTRACT

A display unit having an image display area for displaying an image, an operation unit by which a predetermined area in the image display area is designated in a movable manner, and a filter unit performing filter processing on the image corresponding to the predetermined area designated in the movable manner by the operation unit. Accordingly, it is possible to easily perform an operation of overlapping a plurality of filter effects, and a comparison of images based on the presence/absence of a filter effect, or different filter effects, without performing a complicated filter operation.

16 Claims, 12 Drawing Sheets

(51) Int. Cl.
  *G06F 3/0484* (2013.01)
  *G06F 3/0488* (2013.01)
(52) U.S. Cl.
  CPC ..... *G06F 3/04886* (2013.01); *H04N 5/23219* (2013.01); *H04N 5/23229* (2013.01); *H04N 5/23293* (2013.01); *H04N 5/772* (2013.01)
(58) Field of Classification Search
  USPC ..................................................... 348/222.1
  See application file for complete search history.

(56) References Cited

U.S. PATENT DOCUMENTS

| | | |
|---|---|---|
| 2008/0212888 A1 | 9/2008 | Rai |
| 2010/0080484 A1 | 4/2010 | Shimodaira |
| 2015/0281591 A1 | 10/2015 | Yahyavi |

FOREIGN PATENT DOCUMENTS

| | | |
|---|---|---|
| JP | 2011-015092 A | 1/2011 |
| JP | 2011-185999 A | 9/2011 |

OTHER PUBLICATIONS

Japanese Office Action dated Jul. 11, 2017 as issued in corresponding Japanese Application No. 2014516674 and its English translation thereof.
Chinese Office Action dated Jan. 24, 2018 issued in corresponding application No. 201380026576.9 and its English translation thereof.
Japanese Office Action and English translation thereof issued in corresponding application No. 2014-516674 dated Mar. 27, 2018.

* cited by examiner

ELECTRONIC CAMERA, IMAGE DISPLAY DEVICE, AND STORAGE MEDIUM STORING IMAGE DISPLAY PROGRAM

CROSS-REFERENCE TO RELATED APPLICATIONS

This application is a Continuation of U.S. application Ser. No. 14/402,004, filed Feb. 20, 2015, which is a U.S. National Stage application claiming the benefit of prior filed International Application number PCT/JP2013/003253, filed May 22, 2013, in which the International Application claims a priority date of May 22, 2012, based on prior filed Japanese Application Number 2012-116258, the entire contents of which are incorporated herein by reference.

TECHNICAL FIELD

The present application relates to an electronic camera, an image display device and an image display program.

BACKGROUND ART

In electronic cameras in recent years, it has become possible to perform various types of filter processing on a shot image through digital image processing, to thereby easily finish creating a desired image. However, the filter processing is generally performed on the entire image displayed on a monitor, so that there was a problem that it is difficult to make a comparison based on the presence/absence of a filter effect, or different filter effects. Further, even when a strength of the filter effect is adjusted, it was difficult to compare the filter effects created by various strength differences, on the same screen. Therefore, there has been considered a technique in which a plurality of special effects are thumbnail-displayed within one screen to make it possible to easily select a desired filter effect (refer to Patent Document 1, for example). Further, a technique in which one screen is divided into a plurality of areas, and the areas are displayed after performing processing through a quantization step which is different for each area, has also been considered (refer to Patent Document 2, for example).

Patent Document 1: Japanese Unexamined Patent Application Publication No. 2011-185999; Patent Document 2: Japanese Unexamined Patent Application Publication No. 2011-015092.

SUMMARY

Problems to be Solved

However, conventionally, there has been a problem such that a complicated operation such as a selection of a type of filter to be used from a menu has to be conducted, and it is not possible to easily perform an operation of overlapping a plurality of filter effects, a comparison of images based on the presence/absence of a filter effect, or different filter effects and the like.

In view of the above-described problems, a proposition of the present invention is to provide an electronic camera, an image display device and an image display program capable of performing, in an easily understandable manner by senses, an operation in which an image displayed on a monitor screen at a time of shooting an image or at a time of editing an image is divided, in a movable manner, into arbitrary plural areas, different types of filter processing are performed for the respective areas, and filter effects are compared.

DISCLOSURE

Means for Solving the Problems

It is characterized in that an electronic camera according to the present invention includes a display unit having an image display area for displaying an image, an operation unit by which a predetermined area in the image display area is designated in a movable manner, and a filter unit performing filter processing on the image corresponding to the predetermined area designated in the movable manner by the operation unit.

It is characterized in that an image display device according to the present invention excluding a shooting function from the electronic camera, further includes an image input unit inputting one of an image to be shot and a shot image, in which the image input unit is formed of either an interface unit which inputs an image stored in an internally or externally connected storage medium or an interface unit which inputs an image through one of broadcasting and communication, the image input by the interface unit is displayed on the display unit, and the filter processing is performed by the filter unit in accordance with an operation of the operation unit.

It is characterized in that an image display program according to the present invention capable of being executed by a computer having a display medium which displays an image and an operation member which provides a man-machine interface, the image display program includes a filter processing step of performing filter processing on an image of input image data, a display processing step of displaying, on the display medium, a screen having an image display area for displaying the image, an operation processing step of obtaining operation information made by the operation member by which a predetermined area in the image display area is designated in a movable manner, in which in the filter processing step, the filter processing is performed on the image corresponding to the predetermined area designated in the movable manner by the operation processing step.

Effects

An electronic camera, an image display device and an image display program according to the present invention can perform, in an easily understandable manner by senses, an operation in which an image displayed on a screen at a time of shooting an image or at a time of editing an image is divided, in a movable manner, into arbitrary plural areas, different types of filter processing are performed for the respective areas, and filter effects are compared.

DETAILED DESCRIPTION OF THE EMBODIMENTS

Hereinafter, embodiments of an electronic camera, an image display device and an image display program according to the present invention will be described in detail by using the drawings. Note that in the embodiments to be described below, an example of electronic camera including a function of an image display device which is operated by an image display program according to the present invention will be explained, but, a program of a personal computer or a portable terminal which inputs a shot image therein and performs image display processing may be employed, or an image display device itself such as a television or a digital photo frame (electronic photo stand) may also be employed.

Figure 1:
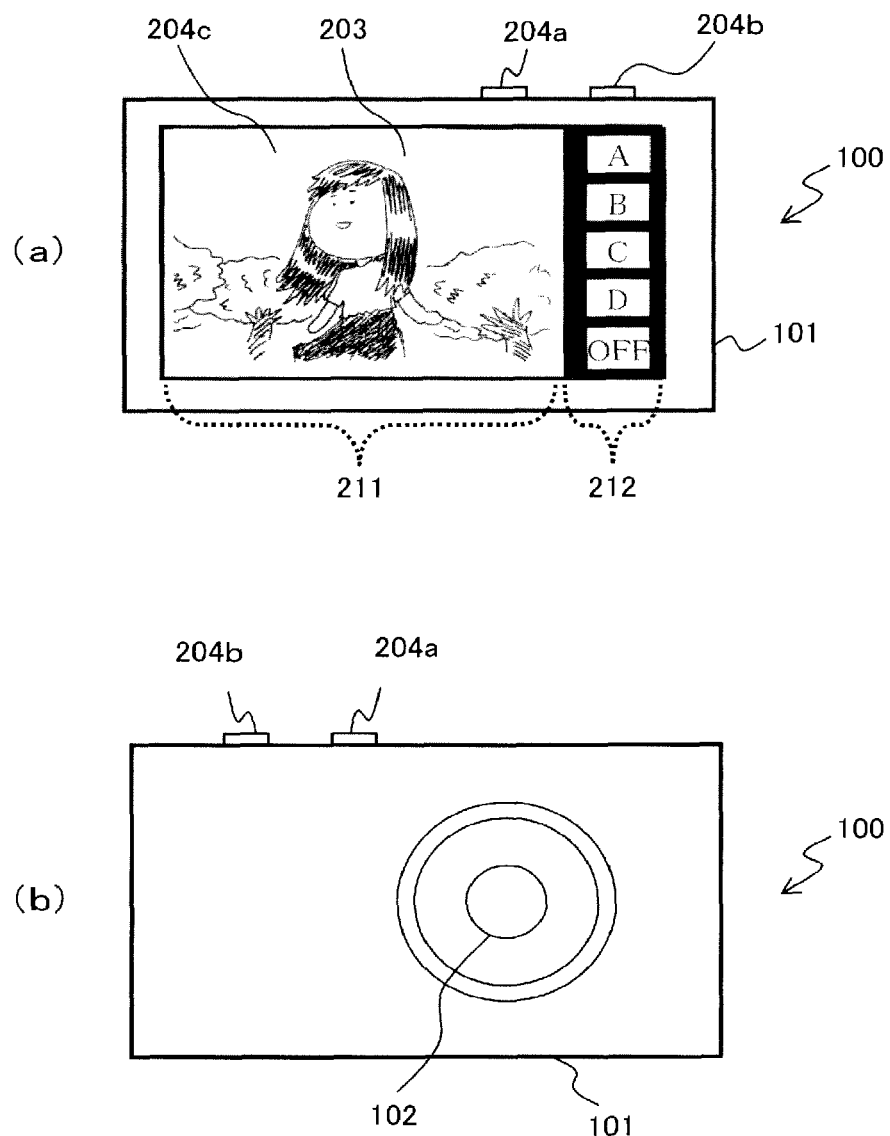
FIG. 1 is diagrams each illustrating an external appearance of an electronic camera 100 according to the present embodiment.

First, an outline of an electronic camera 100 according to the present embodiment will be described. FIG. 1 are diagrams each illustrating an external appearance of the electronic camera 100, in which FIG. 1(a) is a diagram in which a camera body section 101 is seen from a display part 203 side, and FIG. 1(b) is a diagram in which the camera body section 101 is seen from a lens section 102 side. In the camera body section 101, operation buttons such as a power button 204a and a release button 204b are disposed. Further, the display part 203 is formed of a touch panel-type liquid crystal display, and a touch panel 204c is disposed on a screen of the display part 203.

The electronic camera 100 according to the present embodiment can perform various types of filter processing on a through image for checking a subject at a time of performing shooting or a shot image stored in a storage medium and the like, and further, the electronic camera 100 has a function by which a filter effect on the image after being subjected to the filter processing can be easily checked. Here, the filter effect indicates image processing by which a visual effect with respect to the through image, the shot image or the like is changed, and concrete examples thereof are soft focus, color filter, cross filter, chroma adjustment, brightness adjustment, monochrome, sepia tone, edge enhancement, noise reduction and the like. Further, it is possible to perform adjustment of strength level and the like also in each filter. Note that the image on which the filter processing is performed may be a still image or a moving image.

Further, in the electronic camera 100 according to the present embodiment, an image display area 211 for displaying an image on which the filter processing is performed, and a filter list display area 212 for selecting a type of the filter processing (including OFF) are displayed on a screen of the display part 203, as illustrated in FIG. 1(a), for example, and through a simple operation which only requires to select a type of filter by the touch panel 204c and perform an operation of dragging the type of filter onto the image on the image display area 211, it is possible to perform the selected type of filter processing on a part or all of the display image, and further, it is possible to check the filter effect on the image after being subjected to the filter processing. Note that the operation method will be described later in detail.

Figure 2:
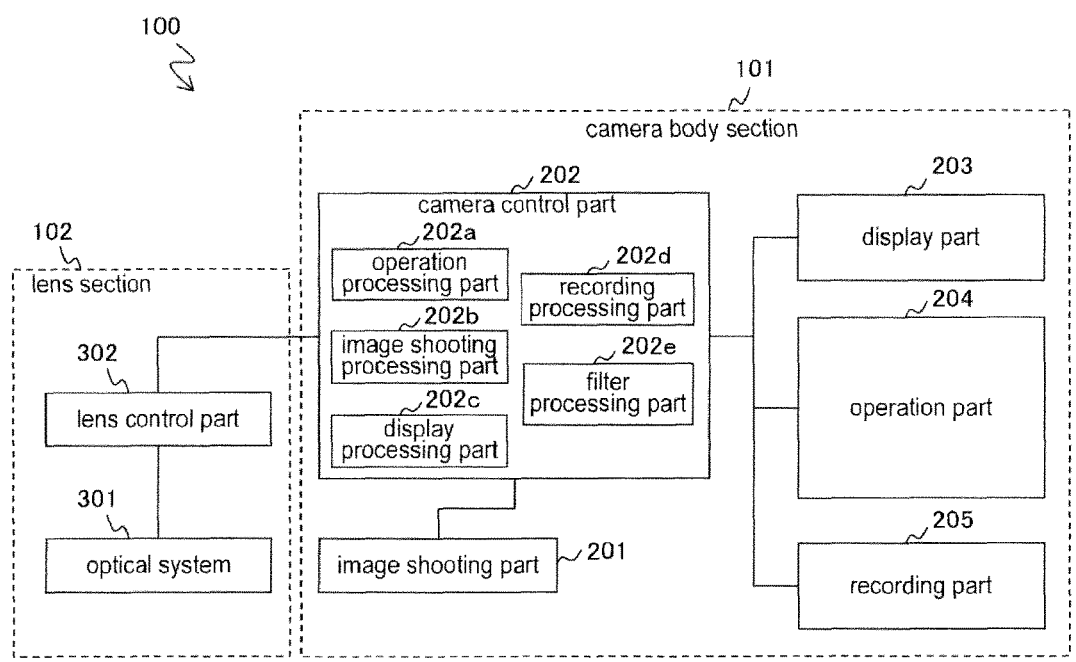
FIG. 2 is a diagram illustrating a configuration example of the electronic camera 100.

Next, a configuration and a basic operation of the electronic camera 100 will be described. FIG. 2 is a block diagram illustrating a configuration example of the electronic camera 100. Note that components denoted by reference numerals same as those of FIG. 1 indicate the components same as those of FIG. 1. In FIG. 2, the electronic camera 100 has the camera body section 101 and the lens section 102. Here, the electronic camera 100 may be a lens integrated type camera in which the lens section 102 and the camera body section 101 are integrated, or a lens interchangeable type camera in which the lens section 102 can be interchanged by being removed from the camera body section 101.

In FIG. 2, the camera body section 101 of the electronic camera 100 has an image shooting part 201, a camera control part 202, a display part 203, an operation part 204, and a recording part 205. Further, the lens section 102 of the electronic camera 100 has an optical system 301, and a lens control part 302.

The image shooting part 201 performs shooting of a subject image formed by the optical system 301 of the lens section 102 to convert the subject image into image data, and outputs the image data to the camera control part 202.

The camera control part 202 has a CPU (central processing unit) which controls an operation of the entire electronic camera 100, and controls, in accordance with a program previously stored in a memory in the inside of the CPU, the image shooting part 201, the display part 203, the operation part 204, the recording part 205, the lens section 102 and the like. For example, when the power button 204a of the operation part 204 is pressed-down, the camera control part 202 activates the electronic camera 100, and displays, on the display part 203, a through image which is input, in real time, from the image shooting part 201. Further, when the release button 204b is pressed-down, the camera control part 202 records image data input from the image shooting part 201 in the recording part 205. Further, at a time of performing shooting, the camera control part 202 gives an instruction, to the lens control part 302 of the lens section 102, regarding a diaphragm control and a control of position of a focus lens of the optical system 301. Note that the processing executed by the camera control part 202 will be described later in detail.

A liquid crystal display, for example, is used for the display part 203. Further, a menu screen using text, graphics and the like and an image are displayed on the display part 203 by the camera control part 202. In the electronic camera 100 according to the present embodiment, an image such as a through image or a shot image is displayed on the image display area 211, and buttons for selecting the type of filter processing (including OFF) are displayed on the filter list display area 212, as explained by using FIG. 1(a).

The operation part 204 has operation members such as, for example, the power button 204a, the release button 204b, and the touch panel 204c. Further, it is also possible to design such that buttons such as a cursor button and a decision button are provided, and the operation is performed by using the cursor button and the decision button, instead of using the touch panel 204c. Further, the operation part 204 also includes a video-recording button for shooting a moving image, an operation button such as a reproduction button for reproducing the shot moving image, a selection dial for performing switching between a shooting mode and a reproduction mode and the like.

For the recording part 205, a nonvolatile memory card, a hard disk or the like is used, for example, and the recording part 205 records image data of a shot still image or moving image. At this time, the image data recorded by the recording part 205 may be image data after being subjected to filter processing, or image data on which the filter processing is not performed.

The optical system 301 has a focus lens, a zoom lens, a diaphragm and the like, and a focus lens position, a zoom lens position, a diaphragm value and the like are controlled by the lens control part 302.

The lens control part 302 has a CPU (central processing unit) which controls an operation of the lens section 102, and operates in accordance with a program previously stored in a memory in the inside of the CPU. For example, when the camera control part 202 gives an instruction to move a position of the focus lens, the lens control part 302 moves the focus lens to the instructed position.

The electronic camera 100 according to the present embodiment is configured as above, and it is possible to display, on the display part 203, an image shot by the image shooting part 201 or a shot image stored in the recording part 205. Further, it is possible to perform filter processing on the image displayed on the display part 203, as explained by using FIG. 1(a).

Next, contents of processing of the camera control part 202 will be described. In an example of FIG. 1, the camera control part 202 executes processing of an operation processing part 202a, an image shooting processing part 202b, a display processing part 202c, a recording processing part 202d, and a filter processing part 202e.

The operation processing part 202a inputs operation information therein from the operation part 204, and delivers the information to each processing corresponding to the operation information. For example, regarding the release button 204b, when operation information indicating that the release button 204b is pressed-down, is input into the operation processing part 202a from the operation part 204, the operation processing part 202a outputs the operation information to the image shooting processing part 202b. Further, regarding the touch panel 204c, the operation processing part 202a inputs coordinate position therein at which the touch panel 204c is touched by a finger or the like. Subsequently, the operation processing part 202a outputs information displayed at the coordinate position on a screen of the display part 203 (button indicating a type of filter in FIG. 1(a)) to the filter processing part 202e.

When the image shooting processing part 202b receives, from the operation processing part 202a, operation information indicating that the release button 204b is pressed-down, for example, it performs shooting of a subject image using the image shooting part 201. Further, the image shooting processing part 202b cooperates with the lens control part 302 to perform processing such as a focus control and a diaphragm control of the optical system 301 of the lens section 102.

The display processing part 202c displays a menu screen and an image on the display part 203. For example, the display processing part 202c displays, on the filter list display area 212 on the screen of the display part 203, information indicating a type of filter output by the filter processing part 202e, and displays an image on the image display area 211.

The recording processing part 202d performs processing of storing image data of an image shot by the image shooting processing part 202b, in a memory card or the like of the recording part 205.

In accordance with information regarding the type of filter and information regarding an area on which the filter processing is performed, received from the operation processing part 202a, the filter processing part 202e performs the filter processing of the designated type on the designated area.

As described above, the electronic camera 100 according to the present embodiment can perform the filter processing on an arbitrary area of the image displayed on the screen of the display part 203, through a simple operation of the operation part 204.

[Basic Operation of Filter Processing]

Figure 3:
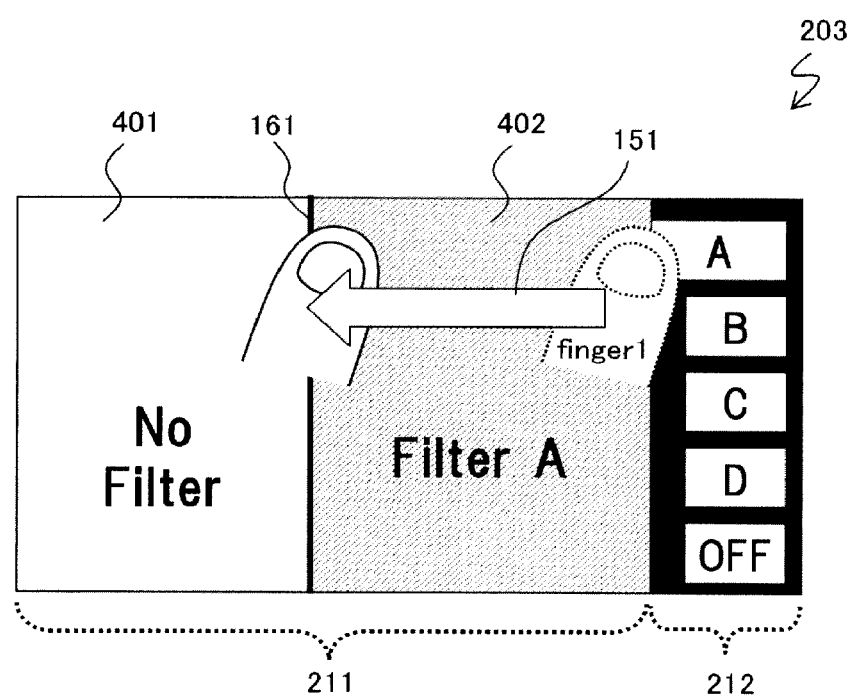
FIG. 3 is a diagram illustrating an example of basic operation of a filter.

First, an example of basic operation of performing filter processing on an image displayed on the display part 203 will be described. FIG. 3 is a diagram illustrating an example of screen displayed on the display part 203 of the electronic camera 100. Note that a part denoted by a reference numeral same as that of FIG. 1(a) indicates the same component.

In the filter list display area 212 of the display part 203 in FIG. 3, five types of buttons including a filter A, a filter B, a filter C, a filter D, and a filter OFF, are drawn by graphics as types of filters. Further, a finger 1 touches the button of the filter A, slides in the image display area 211 through a drag operation 151 in the state of touching the button, and moves up to a vicinity of a center of the screen. At this time, the display of button indicating the type of filter touched by the finger 1 is drawn out in a direction in which the drag operation is performed, and when the finger enters the image display area 211, a boundary line 161 is displayed at a position on the screen touched by the finger 1, in a direction orthogonal to the slide-in direction. Further, the boundary line 161 moves in the image display area 211 in accordance with the movement of the finger 1 that performs the drag operation and is disposed at a position at which the movement of the finger 1 is stopped, and the filter processing of the selected type (processing of filter A (Filter A) in the example of FIG. 3) is performed on an area 402 from a position at which the finger 1 slides in the image display area 211 to the boundary line 161. Here, on an area 401 which is not subjected to the drag operation 151 by the finger 1, the processing of the filter A is not performed, and a state of no filter (No Filter) is created.

In the manner as described above, it is possible to perform the selection of the type of filter and the setting of area on which the selected type of filter processing is performed, through a simple operation. In particular, in the area 402 on which the filter processing is performed, the boundary position 161 is set in a movable manner through the drag operation 151 with the finger 1, so that it is possible to compare effects based on the presence/absence of the filter processing, within one screen of the same image, while freely changing the area on which the processing of the filter A is performed.

Here, when the finger 1 turns back, while performing the drag operation, in a direction from which the finger 1 that performs the drag operation 151 slides in the image display area (right side of the drawing), the boundary position 161 also turns back to the right side of the drawing in accordance with the movement of the finger 1, resulting in that the area 401 with no filter is increased to the right side of the drawing, and conversely, the area 402 after being subjected to the processing of the filter A becomes small.

Note that it is also possible to design such that even when the finger 1 is released from the touch panel 204*c*, the boundary position 161 returns, to the direction from which the finger slides in the image display area, so as to be pulled back by a spring, resulting in that the area 402 subjected to the processing of the filter A is eliminated, and the image with no filter is displayed on the whole area of the image display area 211.

Alternatively, it is also possible that when the finger 1 is released from the touch panel 204*c*, the boundary position 161 is in a state of being set at the position. In this case, it is possible that the finger 1 touches the boundary position 161 again to restart the drag operation. Further, it is also possible to design such that when the finger 1 performs a flick operation (operation in which a finger touches a screen and performs flick in an intended direction) in the direction from which the finger slides in the image display area, on the area 402 to which the filter A is applied, the boundary position 161 is returned, like a spring, to the direction from which the finger slides in the image display area, to thereby eliminate the area 402 after being subjected to the processing of the filter A. Alternatively, it is also possible to design such that when the OFF button at the filter list display area 212 is touched by the finger 1, the effect of the processing of the filter A is eliminated.

Figure 4:
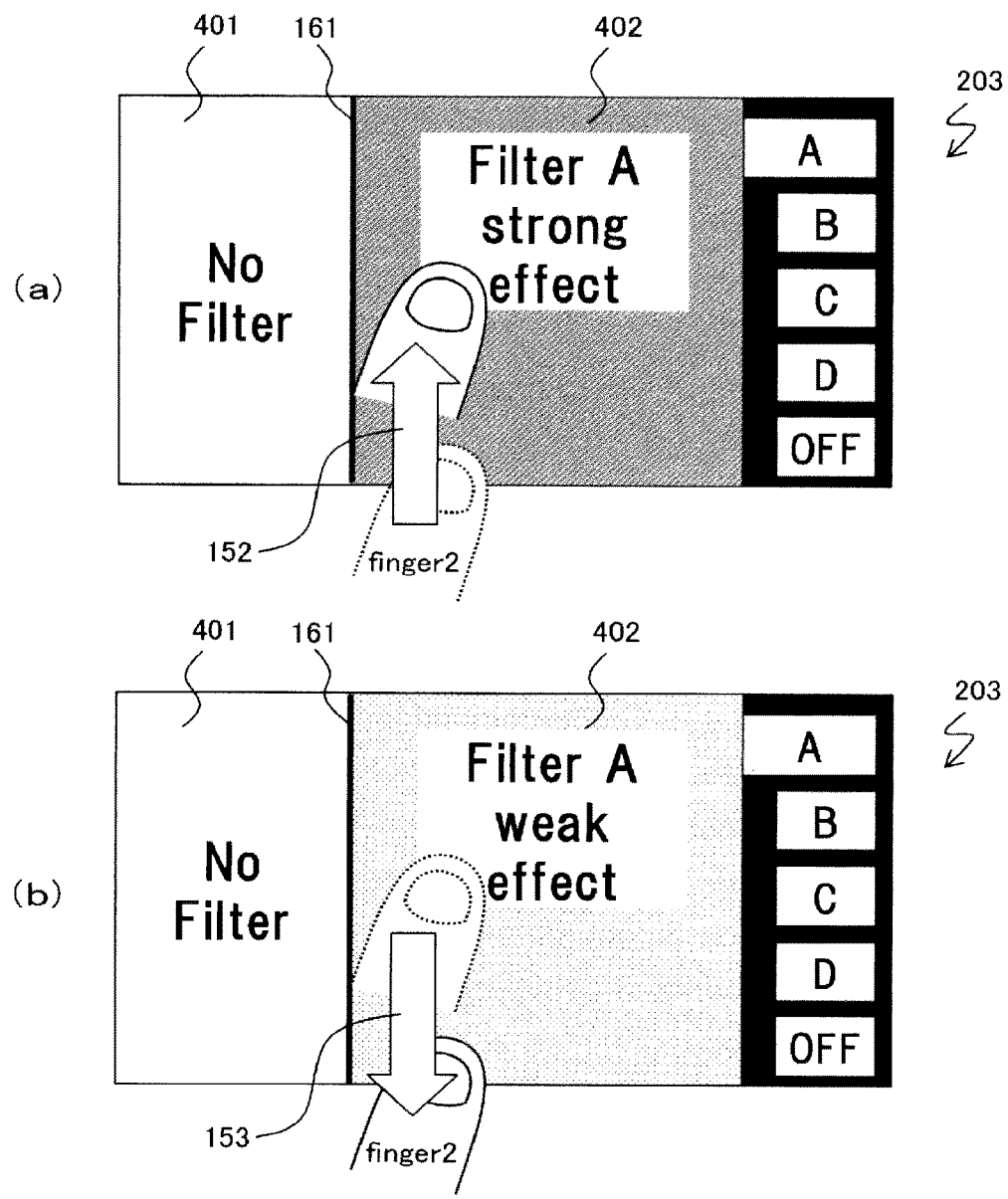
FIG. 4 is diagrams each illustrating an example of operation of adjusting a strength level of a filter effect.

Next, an example of operation of adjusting a strength level of the filter effect will be described. FIG. 4 are diagrams each illustrating a state where the operation of applying the filter A explained in FIG. 3 is performed, and then under that state, the operation of adjusting the effect of the filter A is performed. Note that it is set such that the boundary position 161 is not eliminated even if the finger 1 is released, and the area 402 keeps a state in which the filter A is applied thereto.

In the example of FIG. 4, when a finger 2 performs slide operations 152 and 153 in directions (up and down directions in the example of FIG. 4) orthogonal to the direction of the drag operation 151 (right and left directions in the example of FIG. 3) through which the operation of performing the filter processing is conducted in FIG. 3, the strength level of the filter effect can be adjusted. For example, in FIG. 4(*a*), when the finger 2 performs the slide operation 152 in the upper direction of the drawing on the screen of the area 402, the effect of the filter A is increased, and when the finger 2 performs the slide operation 153 in the lower direction of the drawing of the electronic camera 100 as illustrated in FIG. 4 (*b*), the effect of the filter A is decreased. Here, the slide operation indicates an operation in which a finger is moved in a state of touching the touch panel 204*c*.

As described above, in the electronic camera 100 according to the present embodiment, it is possible to adjust the strength level of the filter effect through a simple operation.

Figure 5:
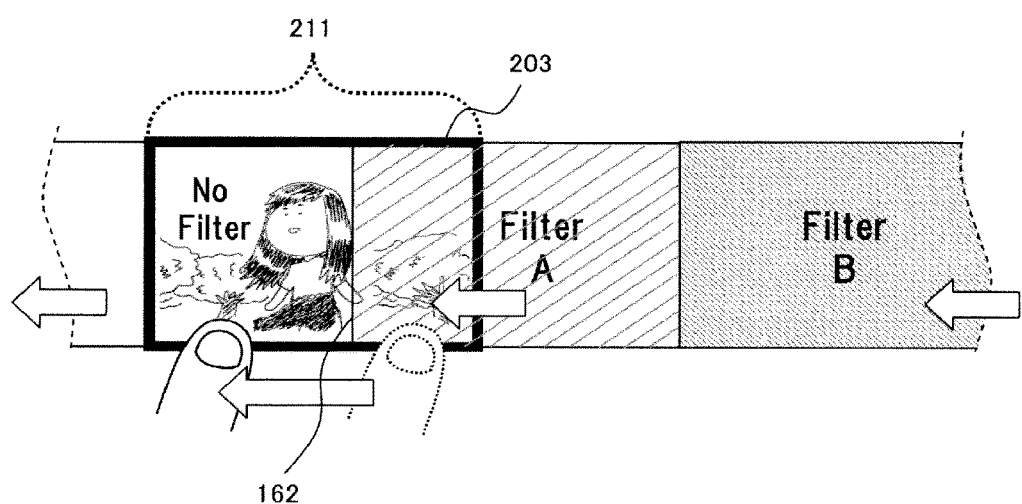
FIG. 5 is a diagram illustrating another example of filter operation.

Note that in the above explanation, an example in which the buttons for selecting the type of filter are displayed on the filter list display area 212 and the two types of filter effects including the filter OFF are compared is explained, but, it is also possible to design such that the method of operation in which the type of filter is drawn out one by one as described above is not employed, and different types of filter layers formed of a plurality of frames which are continuously connected in which an area on which the filter processing is performed is set as one frame, like a 35 mm film, as illustrated in FIG. 5, are scrolled in right and left directions to perform the filter processing in accordance with a position of the frame in the image display area 211 of the display part 203, and the filter effects can be compared at a boundary position of adjacent frames. In this case, the filter list display area 212 illustrated in FIG. 1 and the like is not necessary, and by stopping a boundary position 162 of the filter at an arbitrary position on the screen of the display part 203, images to which the filters of different types including OFF are applied, are displayed on the right and left of the boundary position 162, so that it is possible to compare the two types of filter effects at a position at which the frames of the filter layers are adjacent to each other. Note that it is also possible to design such that an order of the types of filters can be arbitrarily set on the menu screen or the like.

Figure 6:
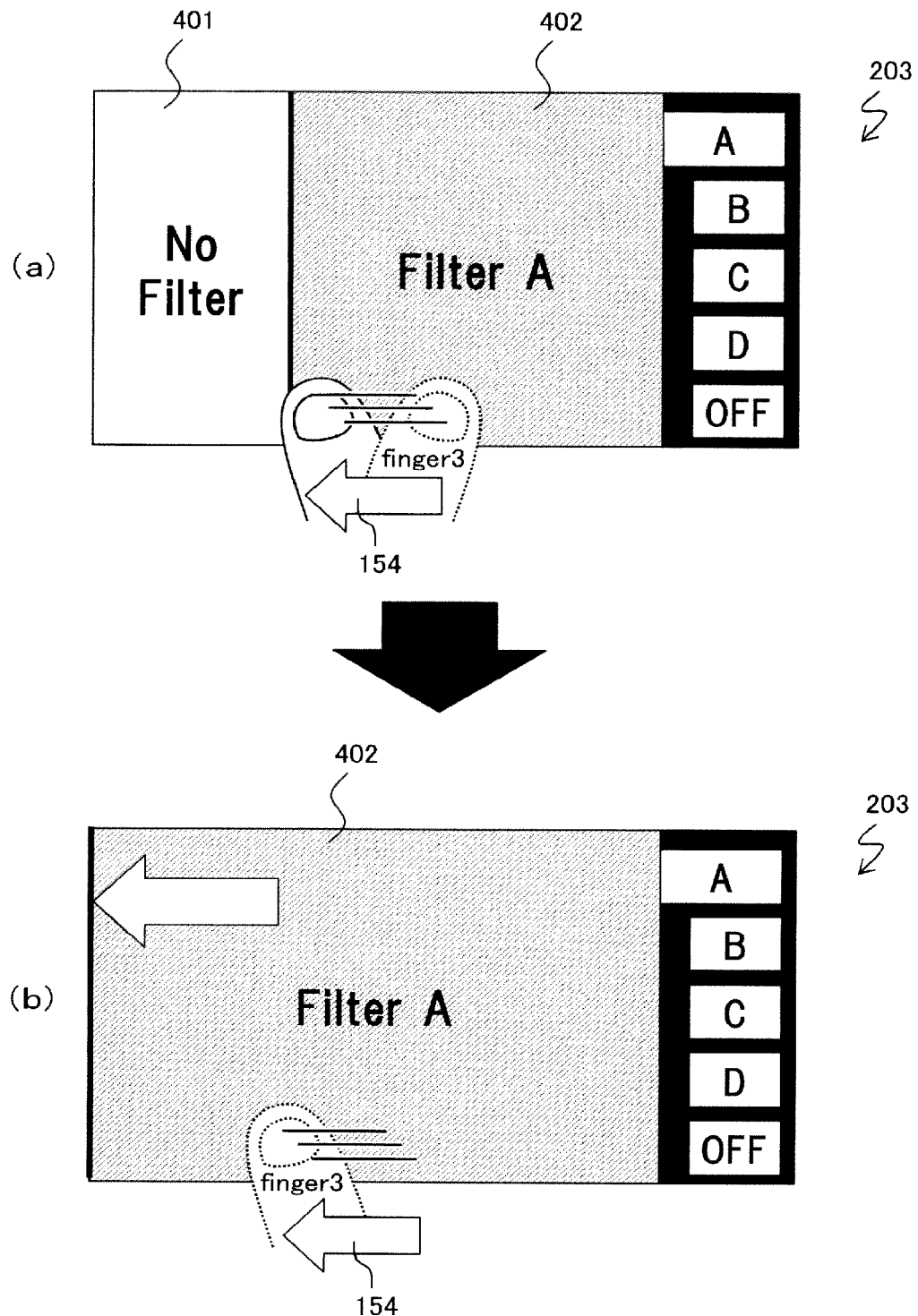
FIG. 6 is diagrams illustrating an example of shooting operation during the filter operation.

Next, an example of operation in which the image after being subjected to the filter processing is shot in the electronic camera 100 according to the present embodiment will be described. FIG. 6 are diagrams illustrating a state in which the operation of applying the filter A explained in FIG. 3 is performed, and then under that state, a shooting operation is performed without pressing-down the release button 204*b* of the operation part 204 of the electronic camera 100. Note that in FIG. 3, it is set such that the boundary position 161 is not eliminated even if the finger 1 is released, and the area 402 keeps a state in which the filter A is applied thereto.

In FIG. 6(*a*), when a finger 3 performs a flick operation 154, on a screen of the area 402 to which the filter A is applied, in the left direction at a previously set acceleration or more, the boundary position 161 moves, so as to slide out, to the left side, resulting in that the area 402 to which the filter A is applied is widened to the entire image display area 211 as illustrated in FIG. 6(*b*), and at a point of time at which the filter A is applied to the whole area, shooting processing is performed in a similar manner to the case where the release button 204*b* is pressed-down.

Note that although the flick operation 154 is designed to be performed in the above explanation, it is also possible to design such that an image is shot when a drag operation in the left direction is performed at the previously set acceleration or more.

As described above, in the electronic camera 100 according to the present embodiment, when the shooting is performed in the middle of conducting the comparison operation of the filter effects, the shooting can be performed without pressing-down the release button 204*b*.

In particular, when the filter operation is performed by using the touch panel 204*c* as described above, it is difficult to press-down the release button 204*b*, so that by enabling the release operation on the touch panel 204*c*, the necessity of holding the electronic camera 100 again is eliminated, which makes it possible to prevent a camera shake and to perform prompt shooting.

Note that in the above explanation, it is set such that in order to prevent a malfunction due to another operation, it is judged that the shooting operation is performed when the flick operation or the drag operation is made at the previously set acceleration or more, but, it is also possible to set such that when another complicated operation is not conducted, the shooting is automatically performed at a point of time at which the filter processing is performed on the entire screen through a normal flick operation, a normal drag operation or the like.

Further, it is also possible to design such that the shooting is not performed at the point of time at which the filter processing is performed on the whole area, but, an image in a state of being subjected to a plurality of types of filter processing is shot at a point of time at which the flick operation is performed. Alternatively, it is also possible to design such that an image after being subjected to a plurality of types of filter processing is shot only in a case where the release button 204b of the operation part 204 is pressed-down.

[Example of Application Operation of Filter Processing]

In the above-described embodiment, it is set such that the filter list display area 212 is disposed on the right side of the display part 203, and the filter list slides in the image display area 211 from the right side to the left side of the image display area, but, the filter list may be disposed in a lateral direction or a vertical direction, and further, the filter list may be disposed at any side among four sides of the image display area 211, and may also be disposed not only at one side but also at two sides or more. For example, in FIG. 7, a filter list display area 213 which displays buttons of filter types same as those of the filter list display area 212 is also disposed on an upper side of the image display area 211.

FIG. 7(a) illustrates a state where a first filter type (filter A in FIG. 7(a)) is selected at the filter list display area 212 on the right side, and is slid in the image display area 211 in the left direction while performing the drag operation to set a boundary position 163, and the processing of the filter A is performed on an area 404 from the position at which the first filter type slides in the image display area to the boundary position 163, as described before (first operation). At this time, the filter is not applied to an area 403 on the left side of the boundary position 163. As illustrated in FIG. 7(b), a second filter type (filter C in FIG. 7(b)) is selected under this state at the filter list display area 213 on the upper side, and is slid in the image display area 211 in the lower direction while performing the drag operation to set a boundary position 164 (second operation).

Here, if a state where the first operation in FIG. 7(a) is not performed (state where the filter processing is not performed on the whole area) is created, the processing of the filter C is performed on an area from the upper side from which the filter C being the type of filter selected at the filter list display area 213 slides in the image display area 211 to the boundary position 164, but, since the second operation is performed after performing the first operation, two types of filter processing are performed on an area in which the first operation and the second operation are overlapped. For example, as illustrated in FIG. 7(b), the area 404 in which only the processing of the filter A by the first operation is performed, an area 405 in which only the processing of the filter C by the second operation is performed, an area 406 in which both of the processing of the filter A by the first operation and the processing of the filter C by the second operation are performed, and the area 403 in which none of the filter processing is performed, are displayed in a matrix format.

As described above, in the electronic camera 100 according to the present embodiment, it is possible to compare the filter effect in the case where the plurality of types of filters are synthesized, and the filter effect in the case where the synthesis is not conducted, in the matrix format. For example, in FIG. 7(b), the filter lists are disposed on two sides being the upper side and the right side of the image display area 211, and by making the filter A slide in the image display area 211 from the right side and making the filter C slide in the image display area 211 from the upper side, it is possible to compare the four types of filter effects obtained by applying no filter, applying only the filter A, applying only the filter C, and synthesizing the filter A and the filter C.

Note that as described by using FIG. 6, it is also possible to design such that when a flick operation at a certain acceleration or more is performed in the operation of the filter C even in the state where the filter A is half-applied in FIG. 7(b), the shooting is automatically performed at a point of time at which the filter C is applied to the whole area.

Further, as illustrated in FIG. 7(c), it is also possible to provide an operation target switching button 501 (button for switching an operation target and changing a high-order and a low-order of layers), to thereby switch, when performing the filter operation (strength level adjustment, shooting operation and the like) in the area 406 in which the filter A and the filter C are overlapped, whether to set the filter A to a high-order layer or to set the filter C to the high-order layer. Accordingly, it is possible to eliminate a problem such that when the filter A is set to a low-order layer and the filter C is set to a high-order layer (the filter applied later is set to the high-order), the filter A cannot be operated in the part in which the filter C is overlapped with the filter A. Alternatively, it is also possible to design such that the operation target switching button 501 is not provided, and by touching the type of filter at the filter list display area 212 or the filter list display area 213, an area to which the filter is applied is switched to a high-order layer.

Figure 7:
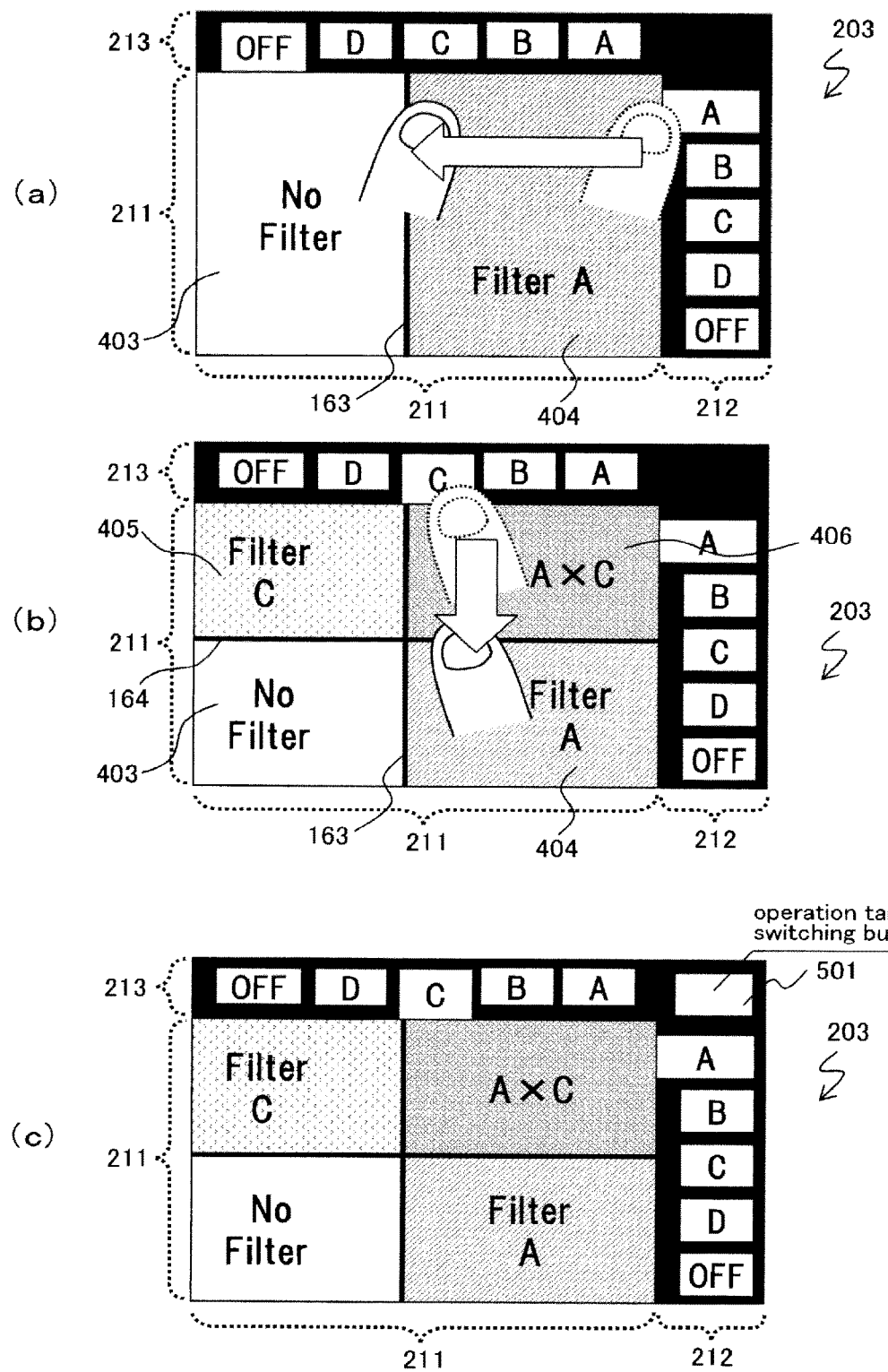
FIG. 7 is diagrams illustrating an example of synthesis operation of filters.
Figure 8:
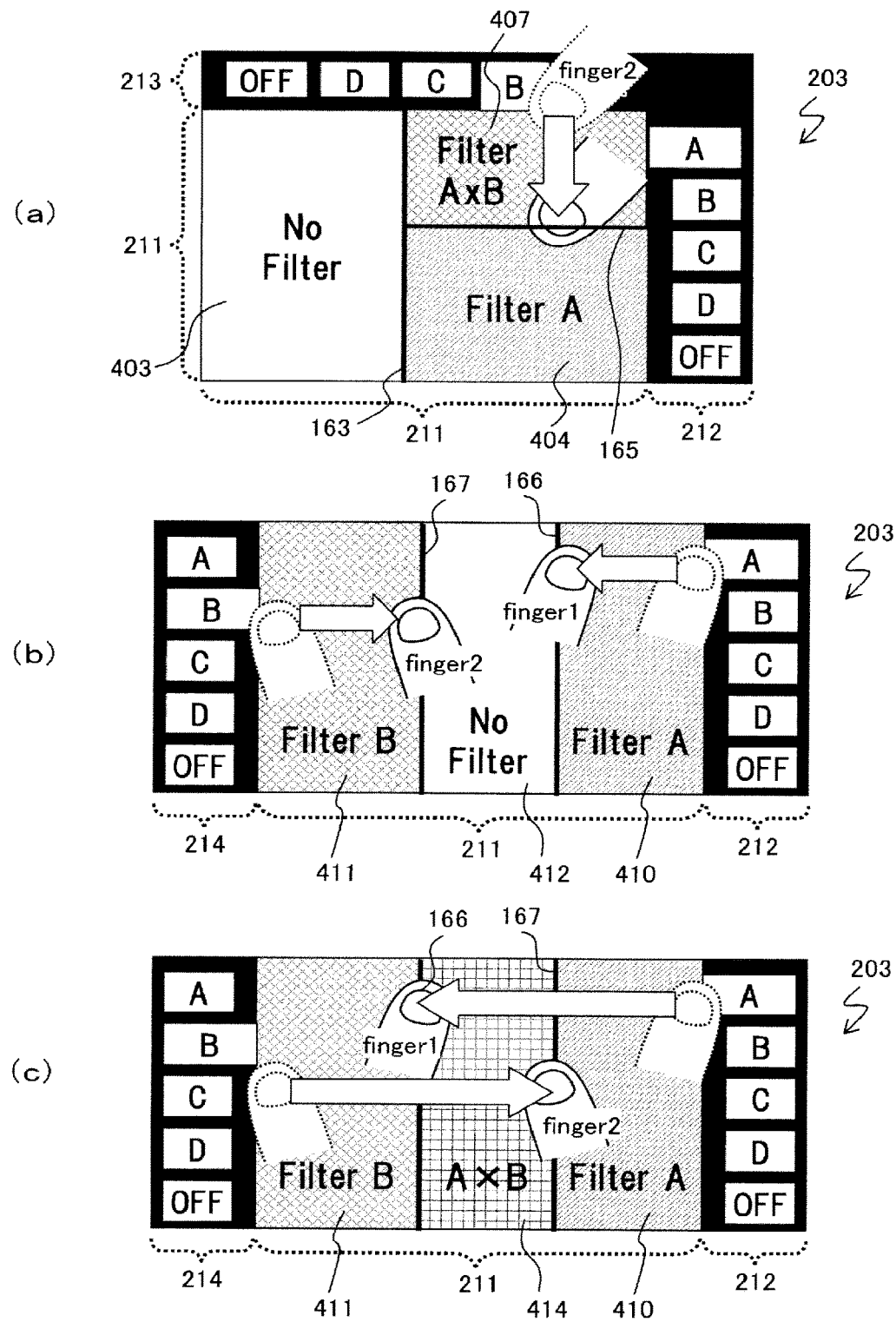
FIG. 8 is diagrams each illustrating another example of the filter operation.

Further, in the example of FIG. 7(b), it is set that the boundary position 164 which is set when the filter type is selected at the filter list display area 213 on the upper side and is slid in the image display area 211, is arranged along the entire right and left of the image display area 211, but, it is also possible to set such that as illustrated in FIG. 8(a), when the filter list slides in the area 404 to which the filter A is applied, a boundary position 165 is set only in the area 404, and the processing of the filter A and the processing of the filter B are synthesized and performed on an area 407.

Further, in the example of FIG. 7, the filter list display area 212 and the filter list display area 213 are disposed on the right side and the upper side of the image display area 211, but, it is also possible to provide the filter list display area 212 and a filter list display area 214 on the right side and the left side of the image display area 211, as illustrated in FIG. 8(b). In this case, the finger 1 selects the filter A from the filter list display area 212 and the processing of the filter A is performed on an area 410 from a position at which the finger slides in the image display area 211 to a boundary position 166, the finger 2 selects the filter B from the filter list display area 214 and the processing of the filter B is performed on an area 411 from a position at which the finger slides in the image display area 211 to a boundary position 167, and an area 412 between the boundary position 166 and the boundary position 167 is in a state where no filter is applied thereto.

Note that in FIG. 8(b), when the boundary position 166 set by the finger 1 and the boundary position 167 set by the finger 2 intersect each other, in an area 414 surrounded by the boundary position 166 and the boundary position 167, both of the processing of the filter A and the processing of the filter B are performed and synthesized, as illustrated in FIG. 8(c).

Figure 9:
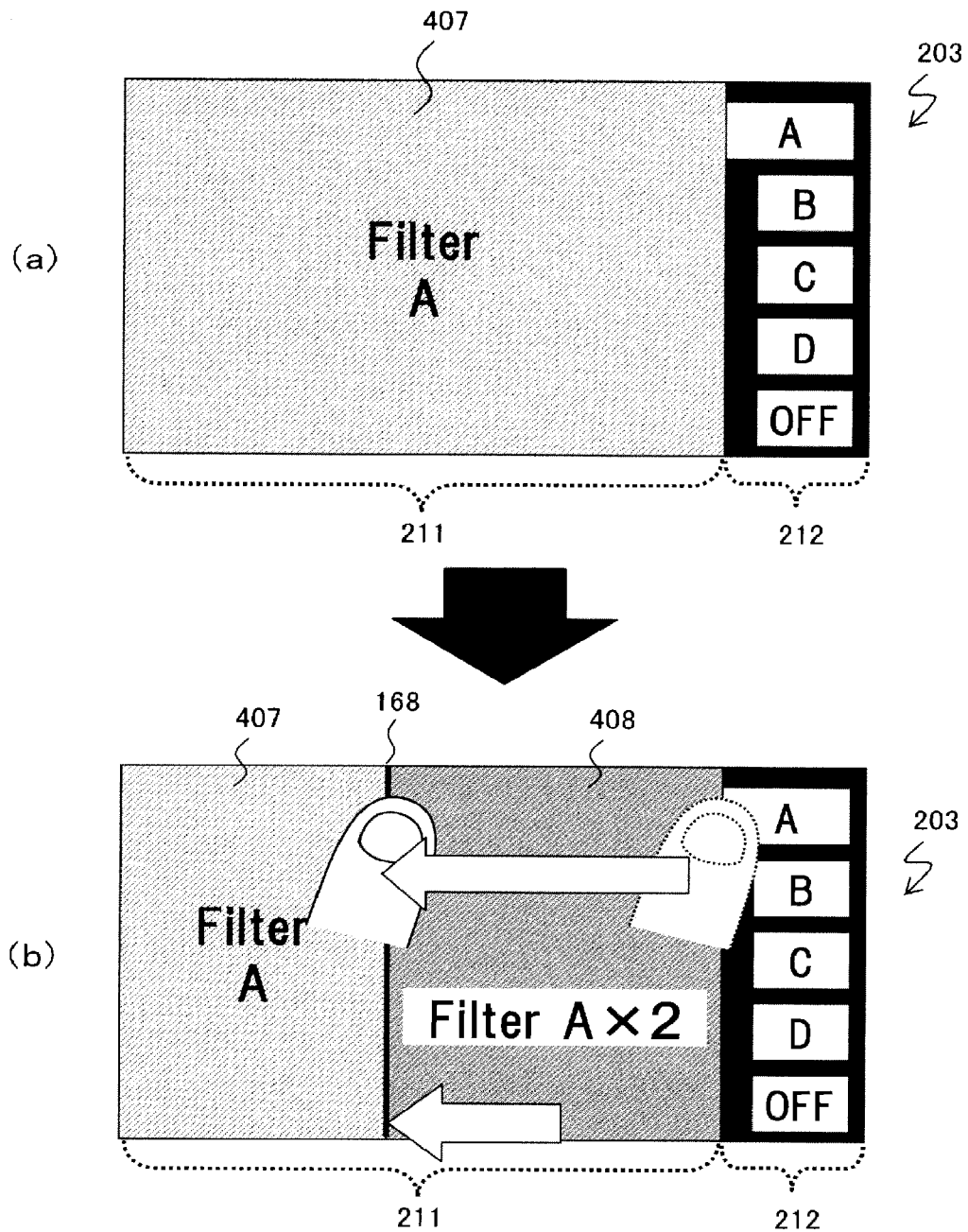
FIG. 9 is diagrams illustrating an example of synthesis operation of filters.
Figure 10:
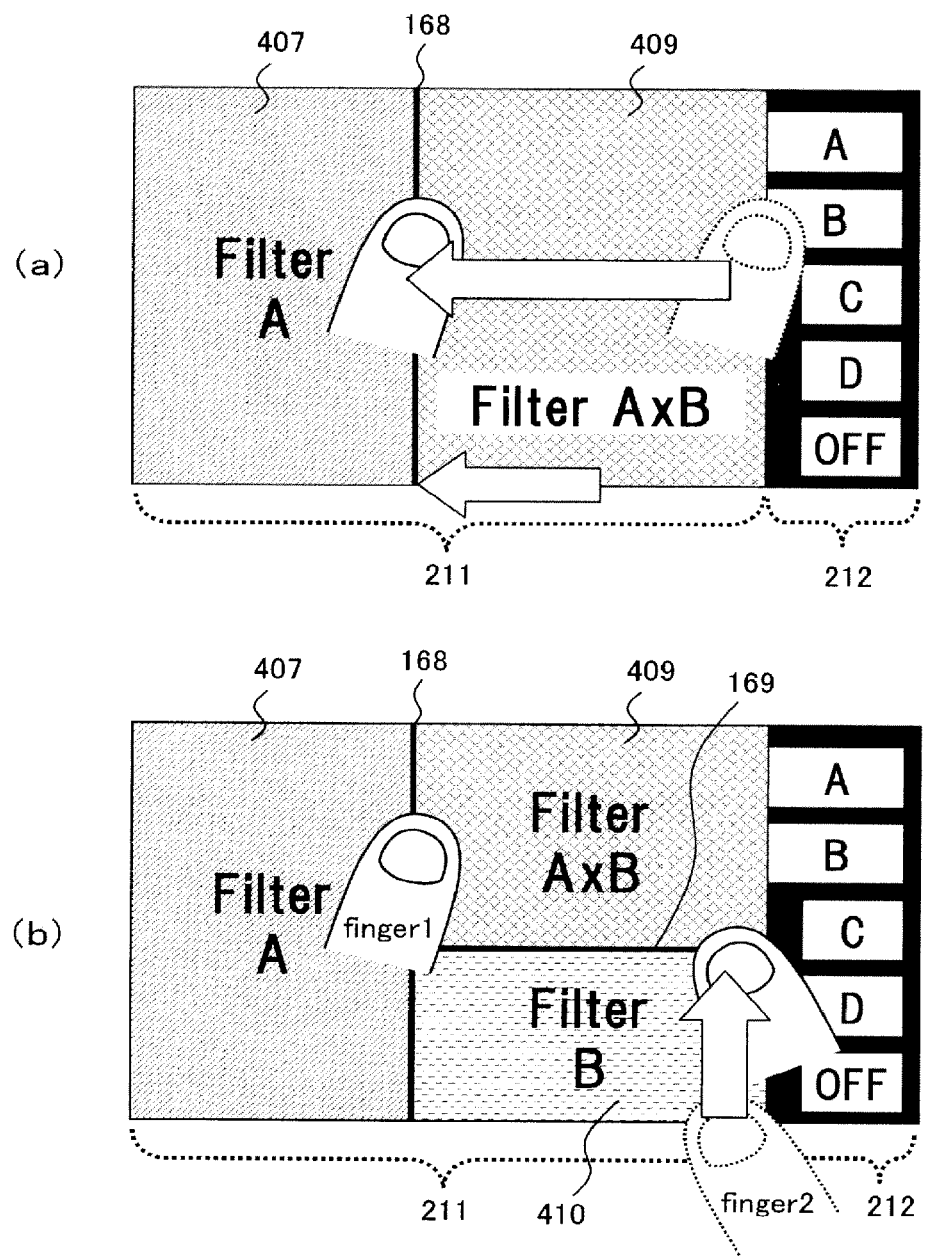
FIG. 10 is diagrams illustrating an application example of the synthesis operation.

Here, in the example of FIG. 7, the filter list display area 212 and the filter list display area 213 are disposed on the two sides of the image display area 211, and the plurality of types of filter processing are synthesized in the matrix format, but, it is also possible to perform the operation of synthesizing the plurality of types of filter processing by using only the filter list display area 212 on the right side. For example, the processing of the filter A is first performed on the area 407 of the entire image display area 211 (or a part of the image display area 211, as illustrated in FIG. 3), as illustrated in FIG. 9(a), and the filter A is selected again from the filter list display area 212 and is slid in the image display area 211 while performing the drag operation to set a boundary position 168 (FIG. 9(*b*)). In this case, on an area 408 from the position at which the filter slides in the image display area to the boundary position 168, the processing of the filter A is performed twice, resulting in that the effect of the filter A is doubled. Note that in the example of FIG. 9(*b*), it is set that the processing of the filter A is performed twice, but, if the filter B is selected for the second time as illustrated in FIG. 10(*a*), a result of synthesis of the two types of filters of the filter A and the filter B is displayed on an area 409.

As described above, by applying the filter A to the whole area, and then making the same filter A slide in the image display area so as to be overlapped with the filter A, it is possible to make a comparison by arranging the effect obtained when the filter A is applied once and the effect obtained when the filter A is applied twice, side by side. Further, by applying the filter A to the whole area, and then making the different filter B slide in the image display area so as to be overlapped with the filter A, it is possible to make a comparison by arranging the effect obtained when the filter A and the filter B are synthesized and the effect of the filter A, side by side.

Here, an example of operation when, in FIG. 10(*a*), the processing of the filter A applied in advance is eliminated from the area 409 in which the two types of filters of the filter A and the filter B are synthesized, and only the effect of the filter B applied later is tried to be checked, will be described by using FIG. 10(*b*). First, when, in a state of keeping the finger 1 by which the operation of setting the boundary position 168 of the filter B is performed, the finger 2 is made to slide in the area 409 from a lower side of the area and to perform a drag operation in the upper direction so as to flip a page, a boundary position 169 is displayed along the right and left directions of the area 409 in which the finger 2 moves. Further, a state where the processing of the filter A in an area 410 from the position at which the finger 2 slides in the area 409 to the boundary position 169 is eliminated, and only the processing of the filter B is performed, is created. Note that although it is designed such that the finger 2 slides in the area 409 from the lower side, it is also possible to design such that the finger 2 slides in the area 409 from the upper side.

As described above, when the filter A is applied to the whole area, and then, in a state where the filter B is slid in the image display area, another finger is used to perform the drag operation so as to perform a flip operation in the upper direction from the lower end of the area in which the filter A and the filter B are synthesized, only the filter B is applied to the part on which the drag operation is performed, resulting in that three effects being the effect of the filter A, the effect of the filter B, and the effect obtained when synthesizing the filter A and the filter B, can be compared on the same screen. Note that it is also possible to design such that the strength level of the filter B is adjusted, when a slide operation in the up and down directions is performed while operating the filter B with the finger 1.

Note that although the example in which the filter A is applied to the whole area, and then the filter B is overlapped with the filter A is described, it is also possible to design such that the filter A is applied to the whole area, and then the same operation is performed without overlapping the filter B with the filter A. Accordingly, it is possible to display two images being an image of an upper part to which the effect of the filter A is applied and an image of a lower part to which no filter is applied, on the same screen, and to compare the two images. Further, it is also possible to design such that by performing the same operation before applying the filter A to the whole area, the effect of the filter A is applied only to an area on the upper right of the image, for example.

[Flow Chart of Filter Operation]

Figure 11:
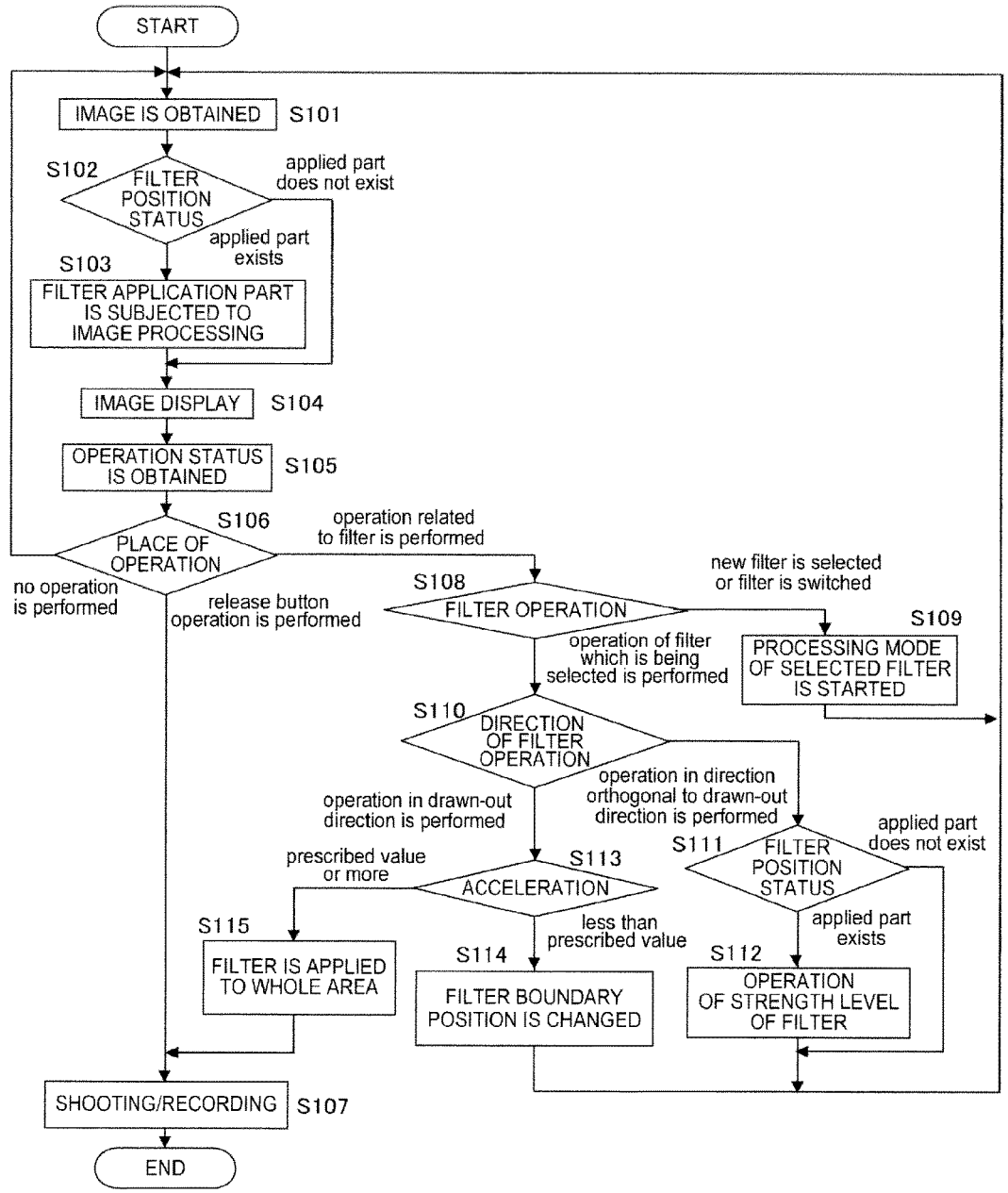
FIG. 11 is a flow chart illustrating a flow of the filter operation.

Next, a flow chart of the filter operation described above will be explained by using FIG. 11. The processing performed in the flow chart in FIG. 11 is executed by a program previously stored in the camera control part 202. Note that it is set that an initial state corresponds to a state where no filter processing is performed, and thus a boundary position and the like are not set. Further, a mode of the filter processing is activated, and on the screen of the display part 203, the image display area 211 and the filter list display area 212 are displayed as explained in FIG. 3, for example.

(Step S101) The camera control part 202 obtains an image shot by the image shooting part 201 (through image). The through image is updated by sequentially obtaining a new image from the image shooting part 201.

(Step S102) The camera control part 202 checks whether or not there is an area on which the filter processing is to be performed or an area on which the filter processing is already performed, in other words, whether or not there is a part to which the filter processing is applied. For example, if a boundary position is set within the image display area 211, it is determined that an applied part exists and the process proceeds to step S103, and when the boundary position is not set within the image display area 211, it is determined that the applied part does not exist and the process proceeds to step S104.

(Step S103) The camera control part 202 performs, on the filter application part, filter processing of a designated type. In FIG. 3, for example, the processing of the filter A is performed on the area 402.

(Step S104) The camera control part 202 displays an image on the image display area 211 of the display part 203. Note that when the filter operation is not conducted, the through image shot by the image shooting part 201 is displayed as it is, and when the filter operation is conducted, an image after being subjected to the filter processing is displayed.

(Step S105) The camera control part 202 obtains an operation status of the filter operation from the operation part 204. For example, the camera control part 202 obtains the operation status such as a state where the type of filter at the filter list display area 212 is touched, a state where the filter list is slid in the image display area 211 and is being subjected to the drag operation, the presence/absence of the flick operation, the acceleration of the flick operation, and the operation direction of the drag operation.

(Step S106) The camera control part 202 discriminates places of the operation. Here, the discrimination regarding whether the operation is the operation related to the filter or the operation of the release button 204*b* of the operation part 204, is conducted. Further, when the release button 204*b* is pressed-down, the process proceeds to step S107, when the operation related to the filter is conducted, the process proceeds to step S108, and when neither of the operations is conducted, the process returns to step S101. Note that in FIG. 3, for example, the operation related to the filter includes the operation of touching the button indicating the type of filter at the filter list display area 212, the operation in which the type of filter is selected and subjected to the drag operation under that state, the flick operation or the drag operation during the filter processing, and the like.

(Step S107) The camera control part 202 performs processing of storing the image shot by the image shooting part 201 in the recording part 205. At this time, when the camera control part 202 performs the filter processing on the through image, it performs filter processing whose effect is the same as that of the filter processing performed on the through image in step S102 and step S103, on the shot image, and stores the processed image in the recording part 205.

(Step S108) The camera control part 202 discriminates whether the operation is a new filter operation (or a switching of operation filter) or an operation regarding the filter which is being selected. Subsequently, when the operation is the new filter operation, the process proceeds to step S109, and when it is the operation regarding the filter which is being selected, the process proceeds to step S110.

(Step S109) The camera control part 202 starts a processing mode of the new filter (or the switched filter), and the process returns to step S101.

(Step S110) The camera control part 202 discriminates the direction of the filter operation. Here, it is discriminated that the filter operation is the operation in a direction same as that in which the type of filter is selected and slid in the image display area 211 (drawn-out direction) or the operation in a direction orthogonal to the drawn-out direction, in which when the filter operation is the operation in the drawn-out direction, the process proceeds to step S113, and when it is the operation in the direction orthogonal to the drawn-out direction, the process proceeds to step S111.

(Step S111) The camera control part 202 checks whether or not the operation in the direction orthogonal to the drawn-out direction is performed on the area 402 after being subjected to the filter processing. In FIG. 4, for example, when the slide operation is performed on the area 402 after being subjected to the processing of the filter A, in a direction orthogonal to the drawn-out direction of the filter A, it is determined that an applied part exists and the process proceeds to step S112, and even when the slide operation is conducted in the orthogonal direction, if the slide operation is performed on the area 401 on which no filter processing is performed, it is determined that the applied part does not exist and the process returns to step S101.

(Step S112) The camera control part 202 adjusts the strength level of the filter in accordance with the operation in the direction orthogonal to the drawn-out direction. For example, the effect of the filter A is increased in FIG. 4(a), and the effect of the filter A is decreased in FIG. 4(b).

(Step S113) The camera control part 202 discriminates the acceleration of the flick operation or the drag operation performed in the direction same as the drawn-out direction. Further, when the acceleration is less than a previously set prescribed value, the process proceeds to step S114, and when it is equal to or greater than the prescribed value, the process proceeds to step S115. Note that the acceleration can be determined as a change in a speed of moving a coordinate position of the touch panel 204c, for example.

(Step S114) The camera control part 202 changes, in accordance with the drag operation, the boundary position of the area on which the filter processing is performed, and the process returns to step S101.

(Step S115) The camera control part 202 performs the filter processing which is in the middle of processing on the entire image displayed on the image display area 211, and the process proceeds to step S107. At this time, it is also possible to perform the filter processing in a manner that the screen is gradually widened to the entire screen while moving the boundary position with the use of an animation operation.

When a moving image is shot, the shooting/recording step in step S107 is changed to a step of determining whether or not the shooting of the moving image is terminated, or whether the shooting of the moving image is not yet started. When the shooting of the moving image is terminated, the filter processing is performed on the moving image, and the present flow is ended. When the shooting of the moving image is continued, or when the shooting of the moving image is not yet started, the process returns to step S101.

When the still image is shot, the process proceeds to step S107 when the release button 204b is pressed-down in step S106, but, when the moving image is shot, the process proceeds to step S107 when the video-recording button is pressed-down in step S106. When the video-recording button is pressed-down, the shooting of the moving image is started. When the video-recording button is pressed-down again during the shooting of the moving image, the shooting of the moving image is terminated.

The similar operation can be performed also at a time of editing an image. At the time of editing an image, the reproduction mode is set by the operation of the selection dial, and by reading a still image or a moving image from the recording part 205, the obtainment of image in step S101 is conducted.

Although the process proceeds to step S107 when the release button 204b is pressed-down in step S106, when editing the still image, the process proceeds to step S107 when the decision button is pressed-down. The filter processing is performed with respect to the still image, and the processed image is stored in the recording part 205 in step S107. Regarding the stored image, it is possible to store only the still image after being subjected to the filter processing, or it is also possible to store two still images being the still image after being subjected to the filter processing and the original still image (original image) before the filter processing is performed thereon.

When editing the still image, the process proceeds to step S107 when the release button 204b is pressed-down in step S106, but, when editing the moving image, the process proceeds to step S107 when the reproduction button is pressed-down. When the reproduction button is pressed-down, the moving image is reproduced. In step S107, it is determined whether or not the reproduction of the moving image is terminated. The termination of the reproduction of the moving image is determined based on whether the reproduction button is pressed-down again during the reproduction of the moving image, or whether the moving image is reproduced to the end. When the reproduction of the moving image is terminated, the present flow is ended, and when the reproduction of the moving image is not terminated, the process returns to step S101, and the filter processing can be performed during the reproduction of the moving image.

As described above, the electronic camera 100 according to the present embodiment can perform, in an easily understandable manner by senses, the operation in which the image displayed on the screen of the display part 203 at the time of shooting the image or at the time of editing the image is divided, in a movable manner, into arbitrary plural areas, the different types of filter processing are performed for the respective areas, and the filter effects are compared.

[Application Example of Subject Recognition Technique]

Although it is set that in the above-described respective embodiments, the boundary position is set, through the operation of the user, by a straight line parallel to each side of the screen of the display part 203, a subject is recognized by using a facial recognition technique and the like, and a filter boundary position is automatically set at a part having a characteristic of the subject (a facial part, the entire body, or the like). For example, it is possible to automatically set a boundary position, in a circular form, in a periphery of a center position of a recognized face, and to perform blurring or the like within the circular area. Alternatively, by conversely applying filter processing (color enhancement processing, for example) only to an area other than the boundary area, it is possible to apply a filter effect such that a color of clothes is made to be vivid without changing a color tone of the face, for example.

A concrete operation example of utilizing the subject recognition technique is such that, only by flicking, with a finger, a type of filter from the filter list display area 212, the boundary position of circular form or the like is automatically moved from the list position to a center of the subject-recognized position and stopped, and the filter processing of the selected type is performed on the image area within the boundary (facial part, for example). Further, it is also possible to design such that the recognized position (facial part) is automatically enlarged until when it has a previously set size to make it easy to perform a comparison.

As described above, the electronic camera 100 according to the present embodiment can check the filter effect through a simple operation by being combined with the well-known subject recognition technique.

[Application Example of Boundary Position]

Figure 12:
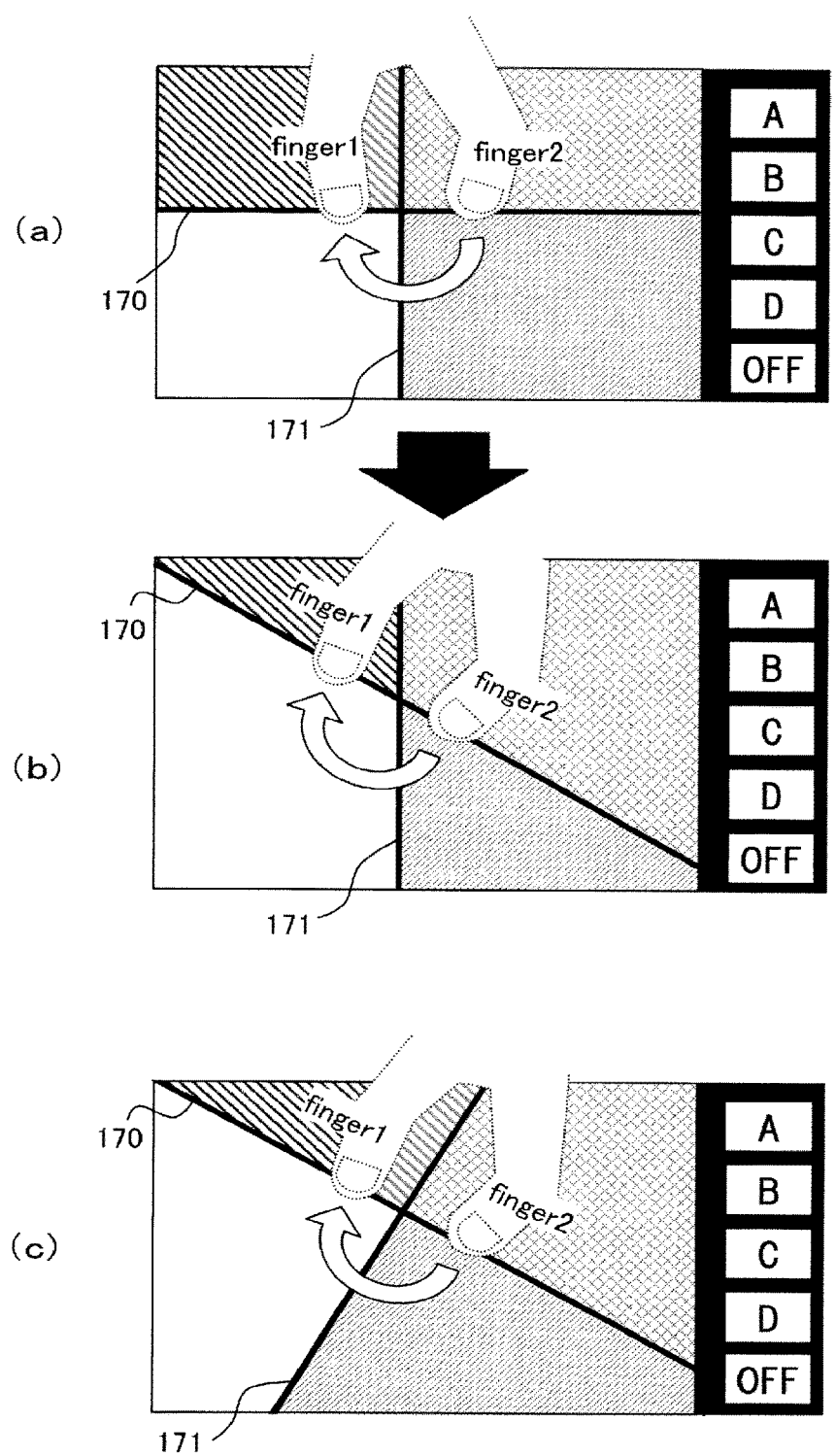
FIG. 12 is diagrams illustrating application examples of the filter operation.

The respective embodiments described before explain the case where the direction of the arranged boundary line is set in either the right-and-left direction (horizontal direction) or the up-and-down direction (vertical direction) with respect to the monitor screen having a rectangular shape, but, the filter boundary may be set to be rotatable. For example, it is also possible to design such that, by performing an operation in which two fingers (the finger 1 and the finger 2) are put on a boundary line 170 to be rotated, and are rotated clockwise by senses as illustrated in FIG. 12(*a*), the boundary line 170 can be rotated to an arbitrary position, as illustrated in FIG. 12(*b*). Alternatively, it is also possible to design such that the entire filter area on the screen is rotated as it is while fixing the image, as illustrated in FIG. 12(*c*). In the manner as described above, it is also possible to design such that the different types of filter processing are conducted for the respective areas formed by a plurality of boundary lines arranged in the diagonal directions, to make it possible to create a stained glass-like picture.

Note that the present embodiment describes the example in which the straight line is used as the boundary line, but, the boundary line may employ a curve or a free-form curve. A concrete operation example in this case is such that an operation is performed on a touch panel with a finger, thereby deciding a boundary line of a curve or a free-form curve. Subsequently, only by performing a flick operation, with the finger, on a type of filter from the filter list display area 212, the boundary position is automatically moved from the list position to the boundary line and stopped, and the filter processing of the selected type is performed. In addition to that, it is also possible to design such that an effect such that the filter effect is gradually increased or decreased is changed in stages with respect to the image display area 211 after being subjected to the filter effect.

[Application Example of Operation Interface]

Note that the present embodiment describes the example in which the touch panel is used as the operation interface of the operation part 204, but, it is also possible to design such that the operation can be made by using a controller such as a mouse or a joystick, cursor buttons of up, down, right, and left, or the like. In this case, a cursor (arrow mark) is displayed on the screen, instead of using the finger, the cursor is moved onto the button of the type of filter to be selected at the filter list display area 212 by using the cursor button, the type of filter is selected by clicking the left button of the mouse, and the cursor is subjected to a drag operation under that state, which enables to set a boundary position of an area on which the filter processing is to be performed, as explained in the above-described embodiment.

Note that the present embodiment explains the example in which the image display area 211 and the filter display area 212 are respectively displayed on the display part 203, but, it is also possible to design such that only the image display area 211 is displayed on the display part 203. In this case, it is also possible to design such that the type of filter is previously selected from the menu screen, and the drag operation is performed from a side, from which the filter effect is to be applied, in the image display area 211 of the display part 203, to thereby set the boundary position. Alternatively, it is also possible to design such that the boundary position is previously set, and after that, the type of filter is selected from the menu screen.

[Example of Application Other than Electronic Camera 100]

In the respective embodiments described before, it is designed such that the filter processing is performed on the through image displayed on the display part 203 at the time of performing shooting by the electronic camera 100, and the filter effect can be checked, but, it is also possible to design such that as an edit operation at a time of reproducing a shot image stored in a memory card or the like of the recording part 205, the filter processing is performed on the reproduced image displayed on the display part 203, and the filter effect can be checked.

Further, it is also possible to employ, not the electronic camera 100, but a dedicated image display device such as a digital photo frame in which an image stored in a recording medium such as a memory or a hard disk is displayed on a monitor having an operation interface of a touch panel, or a television.

Alternatively, it is also possible to install application software performing the screen operation processing, the filter processing and the like described before, on a personal computer having an operation interface such as a touch panel or a mouse, so that it is possible to compare filter effects with respect to an image stored in a recording medium such as a memory or a hard disk, an image downloaded from the Internet or the like, and so on.

As explained, by citing various examples, regarding the filter operation of the electronic camera 100 according to the present embodiment as above, it is possible to easily perform the filter operation itself by senses, and it is possible to make a comparison at an arbitrary position on the image displayed on the display part 203.

Further, it is possible to check, through a simple operation, the filter effect obtained when the plurality of types of filter processing including the same type of filter processing are conducted in an overlapped manner.

In addition to that, it is possible to easily perform the shooting operation, without holding the electronic camera 100 again, after the filter operation or during the filter operation. At this time, the shooting may be conducted at a point of time at which the filter processing is performed on the whole area, or the shooting may also be conducted under a state where different types of filter processing are partially conducted.

As described above, with the use of the electronic camera, the image display device and the image display program according to the present invention, it is possible to perform, in an easily understandable manner by senses, the operation in which the image displayed on the screen at the time of shooting the image or at the time of editing the image is divided, in a movable manner, into arbitrary plural areas, the different types of filter processing are performed for the respective areas, and the filter effects are compared.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. An image processing device, comprising:
a display having an image display area for displaying an image;
an operation interface configured to designate an area in the image display area in a movable manner; and
a filter processor configured to perform filter processing on the image within the area designated in the movable manner by the operation interface,
wherein when an operation is performed by the operation interface in an intersectional direction with respect to the direction in which the operation of designating the area is performed in the image, the filter processor performs the filter processing to increase the filter effect applied to the image when the operation by the operation interface is performed in a first direction with respect to the intersectional direction, and to decrease the filter effect applied to the image when the operation by the operation interface is performed in a second direction with respect to the intersectional direction.

2. The image processing device according to claim 1, wherein
the display further has a filter list display area displaying a list of at least one type of the filter processing.

3. The image processing device according to claim 1, wherein:
the operation interface is formed of a touch panel disposed on a screen of the display, and the area is designated by operating the touch panel; and
the filter processor performs the filter processing on the image corresponding to the area designated by the operation of the touch panel.

4. The image processing device according to claim 2, wherein
the operation interface sets a boundary position to designate the area by selecting a type of the filter processing from the filter list display area and making the type of the filter processing in the state of being selected slide in the image display area.

5. The image processing device according to claim 2, wherein:
an elimination of the filter processing can be selected from the filter list display area; and
when at least either the selection of the elimination of the filter processing from the filter list display area or an operation in a direction different from the direction in which the operation of designating the area is performed by the operation interface, the filter processor cancels the filter effect of the image corresponding to the area after being subjected to the filter processing.

6. The image processing device according to claim 4, wherein:
when the setting of the boundary position through the operation of the touch panel is canceled during the setting of the boundary position through the operation of the touch panel, a direction of the boundary position is changed to a direction different from the direction in which the operation of designating the boundary position is performed; and
the filter processor cancels the filter effect of the area after being subjected to the filter processing, toward the direction in which the boundary position is changed.

7. The image processing device according to claim 2, wherein
when the operation of designating the area by the operation interface is repeatedly conducted, the filter processor performs the selected types of filter processing in an overlapped manner every time the operation is repeatedly performed on the area.

8. An image processing device, comprising:
a display having an image display area for displaying an image;
an operation interface by which an area in the image display area is designated in a movable manner; and
a filter processor performing filter processing on the image corresponding to the area designated in the movable manner by the operation interface, wherein:
the operation interface designates a first area in a movable manner in a first direction of the image display area, and designates a second area in a movable manner in a second direction which is different from the first direction of the image display area; and
the filter processor performs first filter processing on the image corresponding to the first area, performs second filter processing on the image corresponding to the second area, and performs the first filter processing and the second filter processing on the image corresponding to an area in which the first area and the second area are overlapped.

9. The image processing device according to claim 8, wherein
the display further has a filter list display area displaying a list of at least one type of the filter processing.

10. The image processing device according to claim 8, wherein:
the operation interface is formed of a touch panel disposed on a screen of the display, and the area is designated by operating the touch panel; and
the filter processor performs the filter processing on the image corresponding to the area designated by the operation of the touch panel.

11. The image processing device according to claim 9, wherein
the operation interface sets a boundary position to designate the area by selecting a type of the filter processing from the filter list display area and making the type of the filter processing in the state of being selected slide in the image display area.

12. The image processing device according to claim 9, wherein:
an elimination of the filter processing can be selected from the filter list display area; and
when at least either the selection of the elimination of the filter processing from the filter list display area or an operation in a direction different from the direction in which the operation of designating the area is performed by the operation interface, the filter processor cancels the filter effect of the image corresponding to the area after being subjected to the filter processing.

13. The image processing device according to claim 11, wherein:
   when the setting of the boundary position through the operation of the touch panel is canceled during the setting of the boundary position through the operation of the touch panel, a direction of the boundary position is changed to a direction different from the direction in which the operation of designating the boundary position is performed; and
   the filter processor cancels the filter effect of the area after being subjected to the filter processing, toward the direction in which the boundary position is changed.

14. The image processing device according to claim 9, wherein
   when the operation of designating the area by the operation interface is repeatedly conducted, the filter processor performs the selected types of filter processing in an overlapped manner every time the operation is repeatedly performed on the area.

15. A non-transitory computer readable storage medium storing an image display program capable of being executed by a computer having a display medium which displays an image and an operation member which provides a man-machine interface, the non-transitory computer readable storage medium storing the image display program, comprising:
   displaying an image in an image display area;
   designating an area in the image display area in a movable manner; and
   performing filter processing on the image within the area designated in the movable manner,
   wherein when an operation is performed in an intersectional direction with respect to the direction in which the operation of designating the area is performed in the image, performing the filter processing to increase the filter effect applied to the image when the operation is performed in a first direction with respect to the intersectional direction, and to decrease the filter effect applied to the image when the operation is performed in a second direction with respect to the intersectional direction.

16. A non-transitory computer readable storage medium storing an image display program capable of being executed by a computer having a display medium which displays an image and an operation member which provides a man-machine interface, the non-transitory computer readable storage medium storing the image display program, comprising:
   displaying an image in an image display area;
   designating an area in the image display area in a movable manner; and
   performing filter processing on the image corresponding to the area designated in the movable manner, wherein:
      a first area is designated in a movable manner in a first direction of the image display area, and a second area is designated in a movable manner in a second direction which is different from the first direction of the image display area; and
      a first filter processing is performed on the image corresponding to the first area, a second filter processing is performed on the image corresponding to the second area, and the first filter processing and the second filter processing is performed on the image corresponding to an area in which the first area and the second area are overlapped.

* * * * *